June 10, 1930.                G. GRAY                1,762,622
WEDGE
Filed Aug. 16, 1928

INVENTOR.
George Gray.
BY Arthur S. Browne
ATTORNEY

Patented June 10, 1930

1,762,622

UNITED STATES PATENT OFFICE

GEORGE GRAY, OF KANSAS CITY, MISSOURI, ASSIGNOR TO GARNETT CHURCH FURNITURE CO., OF KANSAS CITY, MISSOURI, A COPARTNERSHIP OF L. R. GOWDIE, C. E. GOWDIE, AND G. A. GOWDIE

WEDGE

Application filed August 16, 1928. Serial No. 299,913.

My invention relates to furniture and more particularly to clips for joining parts of furniture such as church pews in which the ends of elongated pew bodies are mounted in pew ends for support therefrom, the principal objects of the invention being to facilitate connection of a pew body with pew ends, to reduce the hazard of damage to pew members in the process of erecting a pew, to fasten the pew bodies in the pew ends by easily removable means, and to assure accurate, secure, and attractive assembly of pew members.

In present practice a pew end is provided with a dovetail routed groove and the end edge of a pew body is loosely mounted in the groove in engagement with the floor of the groove. Wooden keys or wedges are driven into the spacing between the body and one wall of the dovetail groove in tight engagement with the rear face of the pew body and a sharp flange or edge of the groove wall, thus urging the opposite face of the body into tight engagement with the sharp flange edge of the opposite groove wall to form a tight joint. Finishing nails or screws are then driven aslant through the body into the pew end to secure the body to the pew end. A high degree of skill and care and hazard of error and damage are involved in inserting nails in the hard wood, and the nails and keys can be removed only with great difficulty when changes are to be made.

It is therefore a further object of my invention to simplify the joining of members such as a pew body and a pew end, and particularly to adapt a metal wedge for hooking into the pew end and for being fastened to the pew body, whereby the mounting of a wedge and the fastening of the same to the pew body will both latch the body to the pew end as by a wooden wedge and at the same time secure the body to the end against lateral movement. It is also an object of the invention to provide for easy removal of the fastening means for disconnecting the members.

In accomplishing these and other objects of the invention, I have provided improved details of structure, the preferred forms of which are illustrated in the accompanying drawings, wherein.

Figure 1:
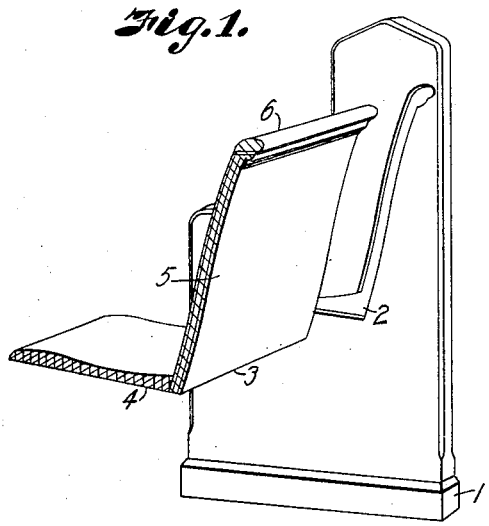
Fig. 1 is a perspective view of an end portion of a pew body and a pew end grooved to receive the same.

Referring in detail to the drawings:

1 designates a support comprising a pew end having a groove 2 on its vertical inner face to receive the end edge of a pew body 3 comprising a seat 4 and a back 5 having a top rail 6. The groove 2 is so formed that its bottom wall or floor 7 is parallel with the surface of the support and therefore extends vertically when the support is in installed position as in the illustrated application of the invention. Opposite taper or beveled walls 8 and 9 of the groove converge outwardly, the groove comprising a recess or slot which in the trade is referred to as a dovetail routed groove.

The groove conforms to the shape of the end edge of the pew body and rail and is wider than the thickness of the pew body members so that the latter may fit loosely therein. In mounted position the end edges of the pew body members abut the vertical floor of the groove, the body and the front faces of the members engage the flange 10 comprising the front sharp salient edge or arris of the groove wall 8 while the rear faces of the members are spaced from the rear wall 9 of the groove.

My invention pertains particularly to clips 11 for latching the pew body to the pew end, and securing the joint between said members, each comprising a head or shank 12 adapted for attachment to the rear surface 13 of a body member, for example the back 5, with the front face 14 of the head in face to face engagement with said surface; and a latching or entrance end toe portion 15 having a point or hook 16 extending angularly rearwardly from the head and adapted to frictionally engage and be pressed into the rear wall 9 of the groove. The latching portion may be introduced into the groove in which a pew body is mounted and pivoting of the clip will move its front face 14 into overlying engagement with the rear surface 13 of the pew body member, and urge the latching portion into latching engagement with the wall 9 of the groove.

A screw opening 17 in the head may extend at a suitable inclination for inserting a fastener such as a nail or screw through the head into the pew body member at a desired angle, the opening ordinarily extending at right angles so that a screw may be driven perpendicularly into the pew body member.

Figure 2:
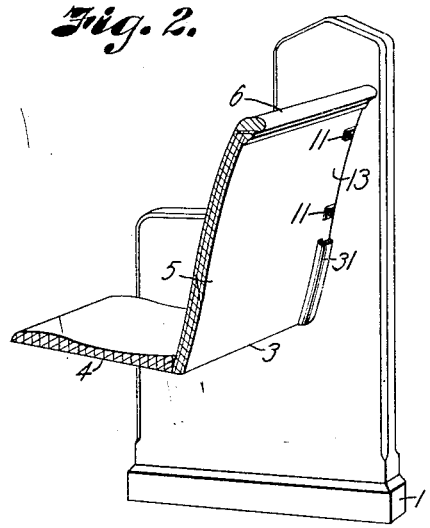
Fig. 2 is a perspective view of the end of a pew body mounted in a pew end and fastened thereto by my improved means, a molding being partly broken away to disclose the fastening means.
Figure 3:
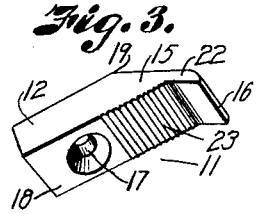
Fig. 3 is an enlarged perspective rear view of a clip embodying my invention.
Figure 4:
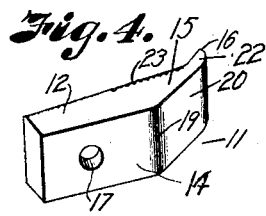
Fig. 4 is a front view of the clip.

I preferably include additional wedge features in the clip whereby the clip is adapted to urge the pew body member into engagement with the front edge 10 of the groove wall, particularly when the pew end is adapted to receive a curved pew body member such as illustrated in Figs. 1 and 2.

The front face 14 and rear face 18 of the clip diverge towards the latching portion, the divergence being substantially equal to the inclination of the wall 9 from a perpendicular on the wall 7, and the front face 14 of the head is preferably diverted rearwardly at 19 to form an inclined face 20 of the latching portion extending in a plane adapted to intersect the plane of the rear face 18, whereby the latching portion may engage the wall 9 upon pivoting of the clip before the head is seated in close engagement with the pew body member. The thickest cross section of the clip is therefore at the line 19 and its thickness is slightly greater than the spacing between the rear surface 13 of the pew body member and the flange or sharp edge 21 of the rear wall 9 of the groove.

The beveled or inclined face portion is shorter than the depth of the groove so that the thicker portion of the clip may be driven a short distance into the groove, indenting the flange 21, to wedge the pew body member against the front flange 10, without causing the point 16 to engage the vertical wall 7 and the clip may pivot to move the latching portion toward the wall 9.

The outer end of the latching portion preferably comprises a wing-like point member 22 extending angularly rearwardly from the rear face 18, the rear face 18 being preferably roughened as at 23 to better engage the wall 9 while the front face of the clip is preferably smooth.

Figure 5:
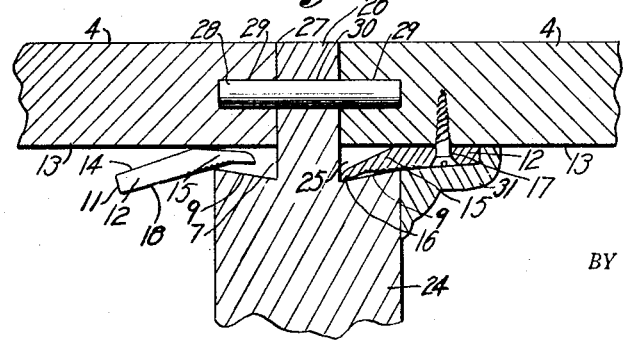
Fig. 5 is a vertical sectional view of a division support and connected ends of pew body members latched to the support by my improved clip.

A support may consist of a division member 24, Fig. 5, having grooves 25 at its upper seat-receiving edge forming a tenon 26 and producing parallel vertical floors 7 and latch-receiving walls 9 similar to those elements of the pew end. In this case the seat members 4 are arranged with their outer faces flush with the outer end edge 27 of the division tenon and are secured to the support in alignment by a dowel 28 extending in recesses 29 of the seat members and through an opening 30 of the tenon.

The clips are then mounted as in the use of the pew ends, the dowel restraining the seat members against the pressure of the wedge-like clips and the clips when latched and fastened by screws preventing separation of the seat members from the support.

Figure 6:
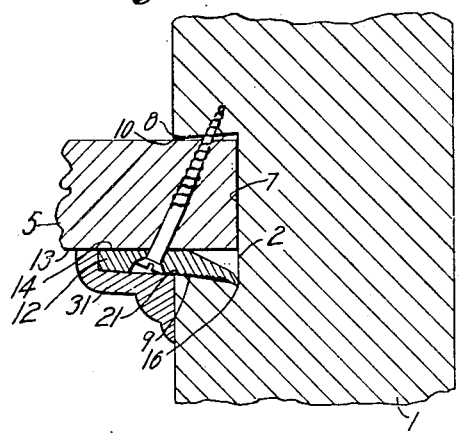
Fig. 6 is a sectional view of a support and pew body member illustrating a modified form of the clip adapted for insertion of a screw through the pew body member into the support.

In the modified form of clip shown in Fig. 6, the screw opening is formed aslant in the clip head to guide the screw for extension through the pew body member into the pew end.

Molding 31 may be mounted on adjacent pew body and pew end portions to enclose and conceal the clips.

In fastening a member such as a back or seat to a support having a dovetail routed groove, the clips are moved inwardly of the groove and pivoted to engage the front faces of the heads with the member and engage the latching portions with the rear wall 9 of the groove. Screws may then be inserted to fasten the clips to the member, thus securing the member against lateral displacement. The additional wedge features further provide that when a clip is pivoted for insertion, a slight blow with a hammer will move the head inwardly to bear oppositely against the sharp edge of the groove wall 9 and the rear surface of the member thus urging the member into tight juncture with the flange of the front wall of the groove. The angular position of the wedge-like clip when the relatively short beveled portion is first placed in the groove facilitates the striking of the head with the hammer for driving the clip pivotally into wedging and latching position.

The clips may be readily extracted after removal of the screws, and thus the pew members may be easily separated without hazard of damage to the surfaces.

Attention is particularly called to the means for mounting the pew body members on a division such as is required when a pew is larger than the maximum length of seat and back members of a pew body. Heretofore division members have been formed similarly to pew ends, having portions projecting upwardly from the pew seat and forwardly from the pew back or requiring the use of outwardly exposed metal strips or connectors on the faces of the pew members. With my construction the outer surfaces of the pew body are flush with the outer edge of the division and the connecting dowel serves similarly to the front wall of a pew end groove to restrain the pew body members in engagement with the division against the pressure exerted by the wedges.

What I claim and desire to secure by Letters Patent is:

1. In combination with a pew joint comprising a pew end having a dovetail routed groove forming spaced aligned edges, and a pew body having an edge mounted in the groove and one face engaging one of said aligned edges, means for securing the body to the pew end comprising a wedge having an inner beveled end portion movable between the pew body and the other of said aligned edges into the groove and provided with a hook at the end of said portion for engaging a wall of the groove, and an outer end portion engageable with the body and the last named groove edge, and means for fastening the outer end portion to the body.

2. In a wedge for the purpose described, a body including a head portion having front and rear faces diverging from its outer end to an entrance end portion and an entrance end portion having a rear face extending in the plane of the rear face of the head portion and a front face diverging from the front face of the head portion toward the rear face of the entrance end portion.

3. In a wedge, a body comprising a head portion having front and rear faces diverging from the outer end thereof, a toe portion having a front face diverging from the front face of the body toward the plane of the rear face of the body, and a point portion extending angularly from the rear face of the toe portion.

4. A wedge for keying a pew body to a dovetail grooved pew end or the like, comprising a body having a front face adapted for face to face engagement with the face of a pew body mounted in the groove of a pew end and a rear face diverging from the plane of said front face to form the rear face of a toe portion adapted for face to face engagement with the wall of the groove when the front face engages the pew body, the body including a toe portion tapered from a point spaced inwardly from the outer edge of the groove when the wedge is in functioning position, said toe portion having a hook on its end extending angularly from said rear face and adapted to enter the wall of the groove to latch the wedge to the pew end, said wedge having an opening adjacent its outer end to receive a member adapted to secure the wedge to the pew body for latching the pew body to the pew end.

In testimony whereof I affix my signature.

GEORGE GRAY.